United States Patent
Chen et al.

(10) Patent No.: US 7,142,721 B2
(45) Date of Patent: Nov. 28, 2006

(54) METHOD OF IMAGE COMPRESSION

(75) Inventors: Sun-Chung Chen, Hsi Chih (TW); Tzyy-Jenq Lou, Taipei (TW); Yi-Li Liu, Vancouver (CA)

(73) Assignee: Aten International Co., Ltd., Taipei (TW)

( * ) Notice: Subject to any disclaimer, the term of this patent is extended or adjusted under 35 U.S.C. 154(b) by 909 days.

(21) Appl. No.: 10/205,223

(22) Filed: Jul. 26, 2002

(65) Prior Publication Data

US 2004/0017950 A1    Jan. 29, 2004

(51) Int. Cl.
*G06K 9/36* (2006.01)
(52) U.S. Cl. ....................... 382/239; 382/236
(58) Field of Classification Search ........ 382/236–239, 382/232–233, 243, 166, 155–160; 375/240.08, 375/240.1, 240.12–240.16; 358/539, 426.02; 706/22, 900
See application file for complete search history.

(56) References Cited

U.S. PATENT DOCUMENTS 5,903,673 A * 5/1999 Wang et al. ................ 382/236
6,031,940 A * 2/2000 Chui et al. .................. 382/240
6,233,017 B1 * 5/2001 Chaddha ................ 375/240.12
6,904,178 B1 * 6/2005 Boliek et al. ............... 382/251

* cited by examiner

*Primary Examiner*—Ishrat Sherali
(74) *Attorney, Agent, or Firm*—Dickinson Wright PLLC

(57) ABSTRACT

A method for image compression is described. The method compresses computer images for efficient transfer of consecutive compressed images through a network. The method comprises loading two consecutive images, fuzzy comparing the two consecutive images, calculating the total different number between the two consecutive images, and determining an encoding algorithm, such as run-length and delta-modulation (RLEDM) or JPEG, according to the total different number. The fuzzy comparison eliminates deviations caused by capturing errors. The RLEDM encoding algorithm of the invention only deals with image differences between the two consecutive images, including line pattern indexes and line patterns, and depends on a minimum encoding size rule to further determine the encoding algorithm, such as a direct encoding, a run-length encoding or a delta-modulation encoding. The method provides an improved encoding algorithm by using a strategy where different circumstances each involve adopting an optimum method to reduce a bandwidth requirement of networks.

23 Claims, 12 Drawing Sheets

FIG. 1 (PRIOR)

METHOD OF IMAGE COMPRESSION

FIELD OF THE INVENTION

The present invention relates to an image compression method, and more particularly to an image compression method dispatching different encoding algorithms according to differences between consecutive images.

BACKGROUND OF THE INVENTION

Image compression is very important for remote control systems. One family of algorithms for image compression is JPEG. Digital images are represented as many blocks according to a JPEG algorithm. Generally, even if only one pixel is changed, the whole block has to be compressed and transferred if loss is undesirable or high video quality is necessary.

One example of the problem above occurs in a remote control system. FIG. 1 illustrates a conventional remote control system which uses image compression algorithms. The system includes a remote controller 120 and a KVM 104 with four computers 102. The remote controller 120 communicates with remote client 124 via network 122. The remote controller 120 consists of A/D converter 106, FIFO 108, I/O module 110, CPU 112, memory controller 114, memory 116 and network interface card (NIC) 118.

As a special example, owing to unsteady data sampled by A/D converter 106, 200 pixels are changed in 200 separated blocks. The system has to compress and transfer 200 blocks, each consisting of 256 pixels, 16*16 pixels. The amounts of the data are very large. The system must be able to read and compress them quickly enough to meet the timing requirements for image refresh.

The timing problems are particularly severe where the sequence of digital images is distributed over a network with limited bandwidth. Some way must be found to compress the scattered pixels of digital images and thereby reduce the bandwidth required to transmit the images to their destinations over a network.

Compression techniques can be used to provide some relief to the transmission bottleneck. However, the amount of compression achieved by existing compression techniques does not provide both high quality and rapid transmission over network connections with limited bandwidth. The resultant transmission is slow and inefficient.

SUMMARY OF THE INVENTION

It is an object of the present invention to provide a method for compressing a computer image and efficiently transferring consecutive compressed images through a network.

It is another object of the present invention to provide a method of image compression particularly for use in a keyboard-video-mouse switch to reduce compressed sizes of the consecutive images and bandwidth requirements of a network.

The method comprises the following steps. First, data is loaded from a previous image block and a current image block. A fuzzy comparison is utilized to analyze the previous pixels and the current pixels. An encoding method is determined according to a result of the fuzzy comparison. Finally, the data of the current image block are encoded.

The fuzzy comparison comprises the following steps. A fuzzy comparison range is loaded. The each pixel of current pixels and each corresponding pixel of previous pixels is compared directly. If the comparison result is equal to zero, the pixels have the same value. If the comparison result is not equal to zero, the current and previous pixels are separated to form RGB data, and then the RGB data are compared. If the RGB data deviations are all within the fuzzy comparison range, the pixels have the same values. If anyone of the RGB data deviations is greater than the fuzzy comparison range, the pixels have different values. Each pixel of the current pixels and each corresponding pixel of the previous pixels are compared. A line pattern index matrix is created where "1" represents positions of the different values and "0" represents positions of the same values, and a difference matrix is created to store the pixel data of the current pixels which have different values.

The method further calculates a total difference number (TDN) according to a quantity of the 1 in the line pattern index matrix. If the TDN is greater than a predetermined threshold, such as 32, the method utilizes a JPEG encoding algorithm to encode the current block. If the TDN is not greater than the predetermined threshold, the method utilizes a run-length and delta-modulation encoding algorithm to encode the current block.

The run-length and delta-modulation encoding further comprise the following steps. The differing pixels are separated from the RGB data and their sequence rearranged to form linear data, such as $$R_{P1}R_{P2}R_{P3}R_{P4}R_{P5}R_{P6}R_{P7}R_{P8}G_{P1}G_{P2}G_{P3}$$
$$G_{P4}G_{P5}G_{P6}G_{P7}G_{P8}B_{P1}B_{P2}B_{P3}B_{P4}B_{P5}B_{P6}B_{P7}B_{P8}.$$

and then either a run-length or delta-modulation encoding algorithm is determined to compress the linear data, such as a direct encoding algorithm, a run-length encoding algorithm or a delta-modulation encoding algorithm. The direct encoding algorithm is utilized if the TDN is less than 4. The delta-modulation encoding algorithm is utilized if the TDN is not less than 4 and value deviations of the data are between −3 and +3. The run-length encoding algorithm is utilized if the TDN is not less than 4 and value deviations of the data are out of the range −3 to +3. If the direct encoding algorithm obtains the smallest compressed data size, the direct encoding algorithm is determined to have compressed the linear data.

The run-length encoding algorithm further comprises a first run-length encoding algorithm that deals with a repeated character of the linear data, such as AAAAAA and a second run-length encoding algorithm that deals with interlaced repeated characters in the linear data, such as ABABAB.

Therefore, the present invention provides a method for compressing a computer image using a proper compression method according to different situations, taking advantage of different compression methods with a reduced image data transfer rate and a reduced network bandwidth requirement so that efficiently transferring consecutive compressed images through a network becomes practical.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The present invention provides improved run-length and delta-modulation methods for encoding consecutive computer images and the consecutive computer images that efficiently transfer to a destination through a network. A detailed description of the characteristics of the present invention is given with reference to FIG. 2 through FIG. 10C in conjunction with the discussion below. The new method is named RELDMP. Herein, RLE stands for Run Length Encoding. It is a no-loss algorithm because it replaces sequences of the same data values within a buffer by a single value and a count number. DM stands delta modulation. Delta modulation (DM) is a subclass of DPCM (Differential Pulse Code Modulation). With this method, only one bit is used to encode the difference. One value then indicates an increase of the predicted value with a certain amount while the other indicates a decrease. P stands position coding and is used to record information for a line pattern.

In accordance with the JPEG standard, the original image is first decomposed into blocks of sixty-four pixels in an 8 by 8 array. Owing to downsampling, four blocks are needed to generate one block data for Cr and Cb. 16 pixels by 16 pixels are defined as a minimum unit.

The RLEDMP algorithm is more efficient than JPEG for block compression when only a few pixels in a block have changed.

Figure 2:
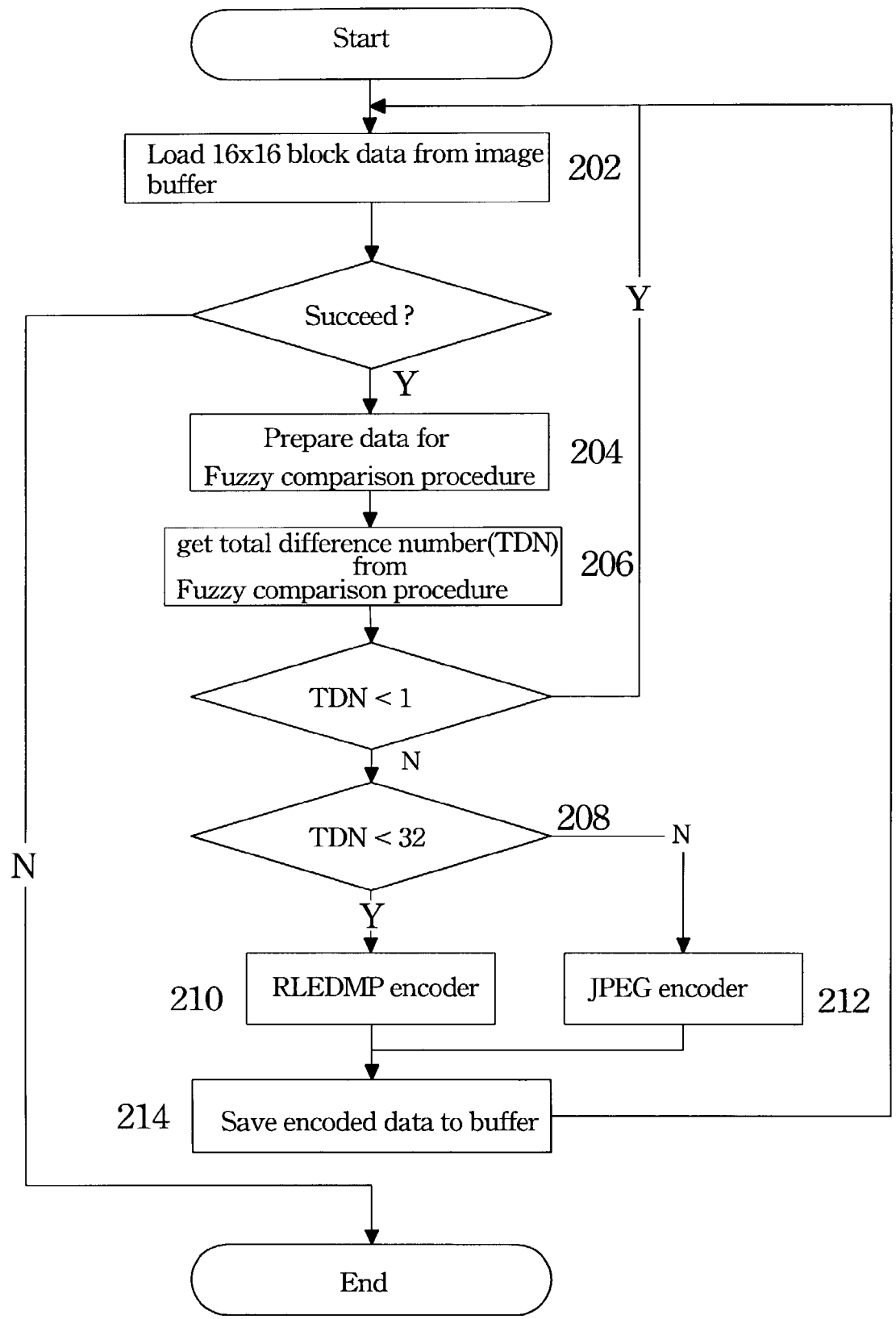
FIG. 2 is a flow chart illustrating the main procedure of dispatcher process for image compression in accordance with the present invention.

FIG. 2 is a flow chart illustrating the main procedure for a dispatch process for image compression in accordance with the present invention. The dispatcher automatically transfers data to specify process depending on fuzzy comparison results. First, in step 202, the dispatch procedure divides the image into 16 by 16 pixel blocks. Next, in step 204, the dispatcher prepares necessary data for the fuzzy comparison procedure. Then, in step 206 the fuzzy comparison procedure compares the current block with the previous block. In step 208, depending on comparison results, the dispatch procedure forwards image data to different compression programs if there are differences between two images, via step 208. Although this flow chart uses thirty-two as a threshold (step 208), any value less than 128 may be used. Two encoders, RLEDMP 210 and JPEG 212, are used in image compression.

Figure 3:
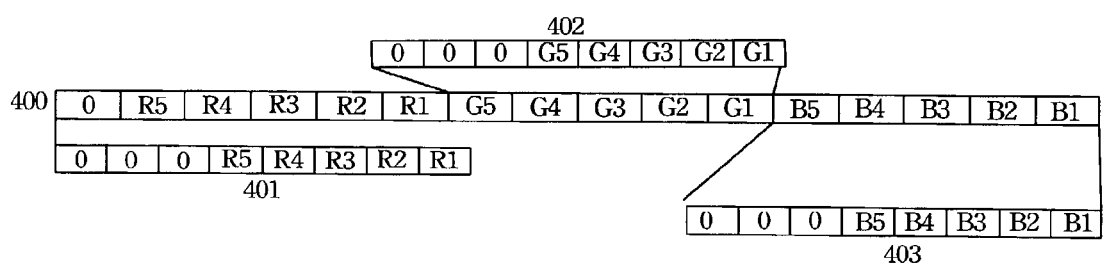
FIG. 3 illustrates RGB555 split into R, G and B according to the present invention.

FIG. 3 illustrates RGB555 split into R, G and B. A pixel from A/D converter 106 uses RGB555 format. The format is 16 bits per pixel; the red, green, and blue components each use 5 bits. The remaining bit is not used. For convenient comparison, the fuzzy comparison procedure splits RGB555 pixel format 400 into R 401, G 402 and B 403 if necessary. 8 bits are used for each component and each component is less than 0x33 20. As a result, an end of buffer character (EOBC) is defined as 0x20.

Figure 4:
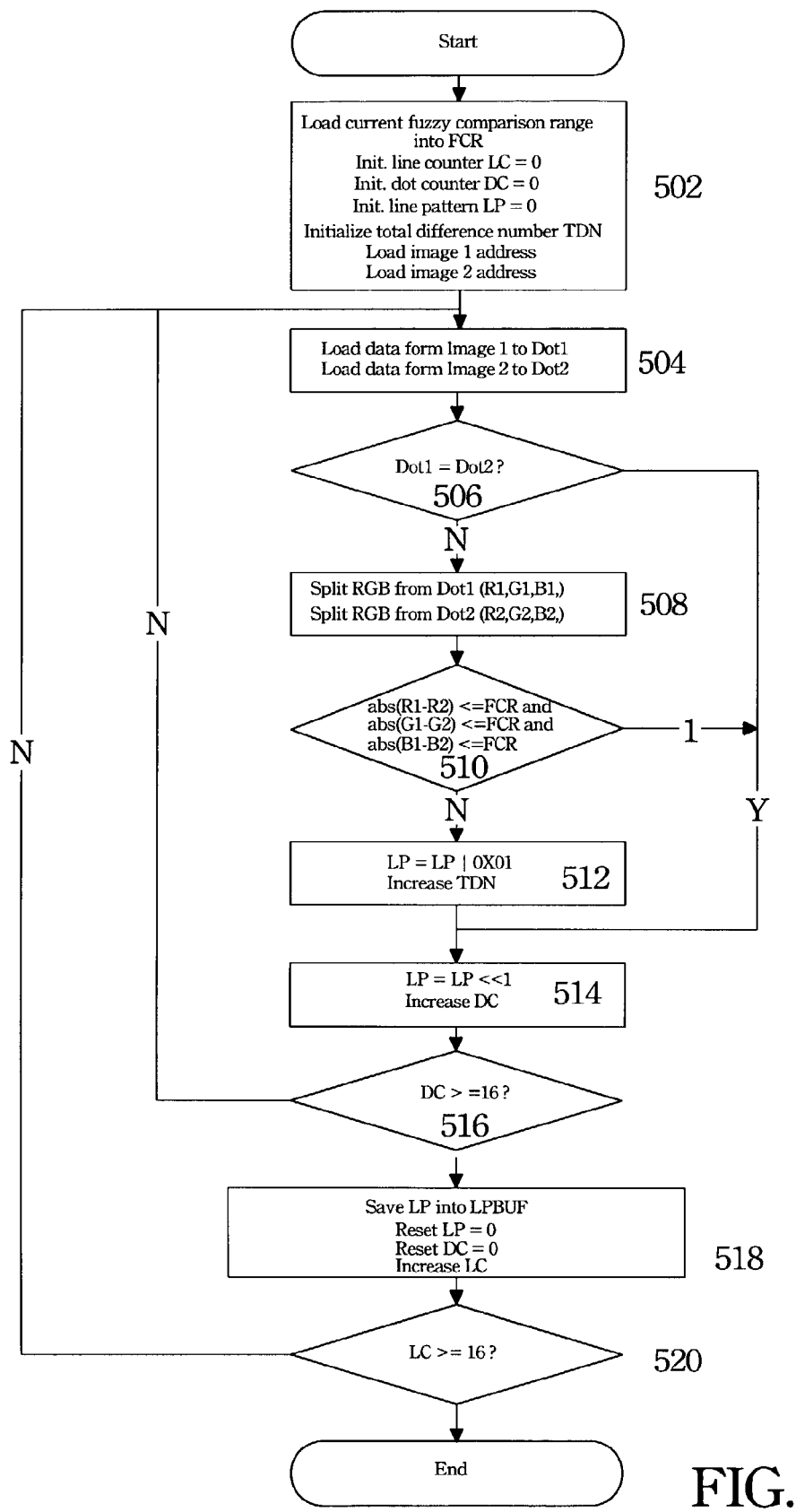
FIG. 4 is a flow chart illustrating fuzzy comparison procedure according to the present invention.

FIG. 4 is a flow chart illustrating a fuzzy comparison procedure. Owing to unsteady data sampled by A/D converter 106, the fuzzy comparison procedure uses a predefine value for comparison. This value is fuzzy comparison range (FCR). The data from A/D convertor 106, such as 0x10, 0x11 or 0x12 are treated equally, that is to say, the data of previous pixel and current pixel are determined to a same value while the difference is not larger than 2. The following equation illustrates the main idea for the fuzzy comparison procedure:

$$Result = Abs(CR-FR) <= FCR \text{ .and. } Abs(CG-FG) <= FCR \text{ .and. } Abs(CB-FB) <= FCR$$

CR, CG and CB stand for current R, G and B split from the current pixel of the current image; FR, FG and FB stand for previous R, G and B split from previous pixels of previous images.

If the result equals zero, the two pixels are different, otherwise the two pixels are equal.

First, in step 502, the process is initialized. In the initialization, the fuzzy comparison range is read, the local variable line counter, dot counter and line pattern are set equal to zero, and the global variable total difference number (TDN) is set equal to zero. Next, in step 504, the current and previous pixels are read from the current and previous image buffers. If step 506 determines the current pixel is equal to the previous pixel, the line pattern is shifted left by one bit, and the dot counter is increased by one, via step 514. If step 506 determines the current pixel is not equal to the previous pixel, the current pixel is split into R1, B1 and G1 and the previous pixel is split into R2, G2 and B2 in step 508. Step 510 uses the above equation to compare the split R, G and B. If R1, G1 and B1 are determined to equal R2, G2 and B2, the process skips step 512 and proceeds to step 514. If R1, G1 and B1 are determined not equal to R2, G2 and B2, the bit 0 of the line pattern is set equal to 1, and the total difference number is increased by one in step 512. Then the process goes to step 514. After step 514, if the dot counter is determined to be less than 16, via step 516, the process then loops back to step 504. After all sixteen dots have been processed, the line pattern is written to the line pattern buffer, and then the line pattern and dot counter are set equal to zero and the line counter is increased by one in step 518. If line counter is determined to be less than sixteen in step 520, the process then loops back to step 504.

The fuzzy comparison procedure not only compares the pixels, but also generates line pattern information for future use. 16 bits are used for each line of the line pattern. A 16-line pattern is attained after the comparison. In each bit in line pattern, 0 means equal while 1 means difference. The following table 1–3 illustrates a previous block, a current block and line pattern buffer information.

TABLE 1

Previous block from previous image.

| | | | | | | | | | | | | | | | |
|---|---|---|---|---|---|---|---|---|---|---|---|---|---|---|---|
| 0000 | 0000 | 0000 | 0000 | 0000 | 0000 | 0000 | 0000 | 0000 | 0000 | 0000 | 0000 | 0000 | 0000 | 0000 | 0000 |
| 0000 | 0000 | 0000 | 0000 | 0001 | 0001 | 0001 | 0000 | 0000 | 0001 | 0001 | 0001 | 0000 | 0000 | 0000 | 0000 |
| 0000 | 0001 | 0001 | 0000 | 0020 | 0020 | 0020 | 0000 | 0000 | 0020 | 0020 | 0020 | 0001 | 0000 | 0000 | 0000 |
| 0000 | 0020 | 0020 | 0000 | 0021 | 0021 | 0021 | 0000 | 0000 | 0021 | 0021 | 0021 | 0020 | 0000 | 0000 | 0000 |
| 0000 | 0021 | 0021 | 0000 | 0000 | 0000 | 0000 | 0000 | 0000 | 0000 | 0000 | 0000 | 0021 | 0001 | 0001 | 0000 |
| 0000 | 0000 | 0000 | 0001 | 0400 | 0400 | 0400 | 0001 | 0001 | 0001 | 0400 | 0400 | 0000 | 0020 | 0020 | 0001 |
| 0000 | 0400 | 0400 | 0020 | 0020 | 0001 | 0020 | 0020 | 0020 | 0020 | 0020 | 0020 | 0400 | 0021 | 0021 | 0020 |
| 0000 | 0020 | 0020 | 0021 | 0001 | 0020 | 0001 | 0021 | 0021 | 0021 | 0001 | 0001 | 0020 | 0000 | 0000 | 0021 |
| 0000 | 0001 | 0001 | 0000 | 0000 | 0021 | 0000 | 0000 | 0000 | 0000 | 0000 | 0000 | 0001 | 0400 | 0400 | 0000 |
| 0000 | 0020 | 0000 | 0400 | 0000 | 0000 | 0020 | 0400 | 0400 | 0400 | 0000 | 0000 | 0000 | 0020 | 0020 | 0400 |
| 0000 | 0021 | 0000 | 0020 | 0000 | 0400 | 0001 | 0020 | 0020 | 0020 | 0000 | 0000 | 0000 | 0001 | 0001 | 0020 |
| 0000 | 0000 | 0000 | 0001 | 0000 | 0020 | 0000 | 0001 | 0001 | 0001 | 0000 | 0000 | 0000 | 0000 | 0000 | 0001 |
| 0000 | 0400 | 0000 | 0000 | 0000 | 0001 | 0000 | 0000 | 0000 | 0000 | 0000 | 0000 | 0000 | 0000 | 0020 | 0000 |
| 0000 | 0020 | 0000 | 0000 | 0000 | 0000 | 0000 | 0000 | 0000 | 0000 | 0000 | 0000 | 0000 | 0000 | 0001 | 0000 |
| 0000 | 0001 | 0000 | 0000 | 0000 | 0000 | 0000 | 0000 | 0000 | 0000 | 0000 | 0000 | 0000 | 0000 | 0000 | 0000 |
| 0000 | 0000 | 0000 | 0000 | 0000 | 0000 | 0000 | 0000 | 0000 | 0000 | 0000 | 0000 | 0000 | 0000 | 0000 | 0000 |

TABLE 2

Current block from current image

| | | | | | | | | | | | | | | | |
|---|---|---|---|---|---|---|---|---|---|---|---|---|---|---|---|
| 0001 | 0000 | 0000 | 0000 | 0000 | 0000 | 7000 | 7000 | 0000 | 0000 | 0000 | 0001 | 0000 | 0000 | 0000 | 0000 |
| 0020 | 0000 | 0001 | 0000 | 0000 | 0000 | 0000 | 7000 | 0000 | 0001 | 0000 | 0020 | 0000 | 0000 | 0000 | 0000 |
| 0021 | 0000 | 0020 | 0000 | 0000 | 0000 | 0001 | 7000 | 0001 | 0020 | 0001 | 0021 | 0001 | 0001 | 0001 | 0001 |
| 0000 | 0001 | 0021 | 0000 | 0001 | 0000 | 0020 | 7000 | 0020 | 0021 | 0020 | 0000 | 0020 | 0020 | 0020 | 0020 |
| 0400 | 0020 | 0000 | 0000 | 0020 | 0001 | 0021 | 7000 | 0021 | 0000 | 0021 | 0400 | 0021 | 0021 | 0021 | 0021 |
| 0020 | 0021 | 0400 | 0000 | 0021 | 0020 | 0000 | 7000 | 0000 | 0400 | 0000 | 0020 | 0000 | 0000 | 0000 | 0000 |
| 0001 | 0000 | 0020 | 0001 | 0000 | 0021 | 0400 | 7000 | 0001 | 0020 | 0400 | 0001 | 0400 | 0400 | 0400 | 0400 |
| 0000 | 0400 | 0001 | 0020 | 0400 | 0000 | 0020 | 7000 | 0020 | 0001 | 0001 | 0020 | 0020 | 0020 | 0020 | 0020 |
| 0000 | 0020 | 0000 | 0021 | 0001 | 0001 | 0001 | 7001 | 0021 | 0001 | 0020 | 0021 | 0001 | 0001 | 0001 | 0001 |
| 0000 | 0001 | 0000 | 0000 | 0020 | 0020 | 0000 | 7000 | 0000 | 0020 | 0021 | 0000 | 0020 | 0000 | 0000 | 0020 |
| 0000 | 0000 | 0000 | 0400 | 0021 | 0021 | 0400 | 7000 | 0400 | 0021 | 0000 | 0400 | 0021 | 0000 | 0000 | 0021 |
| 0000 | 0000 | 0000 | 0020 | 0000 | 0000 | 0020 | 7000 | 0020 | 0000 | 0400 | 0020 | 0000 | 0000 | 0000 | 0000 |
| 0000 | 0000 | 0000 | 0001 | 0400 | 0400 | 0001 | 7000 | 0001 | 0400 | 0020 | 0001 | 0400 | 0000 | 0000 | 0400 |
| 0000 | 0000 | 0000 | 0000 | 0020 | 0020 | 0000 | 7000 | 0000 | 0020 | 0001 | 0000 | 0020 | 0000 | 0000 | 0020 |
| 0000 | 0000 | 0000 | 0000 | 0001 | 0001 | 0000 | 7000 | 0000 | 0001 | 0000 | 0000 | 0001 | 0000 | 0000 | 0001 |
| 0000 | 0000 | 0000 | 0000 | 0000 | 0000 | 7001 | 7000 | 0001 | 0000 | 0000 | 0000 | 0000 | 0000 | 0000 | 0000 |

TABLE 3

Bit information of line patterns after comparison

| | | | | | | | | | | | | | | | |
|---|---|---|---|---|---|---|---|---|---|---|---|---|---|---|---|
| 0 | 0 | 0 | 0 | 0 | 0 | 1 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 1 | 1 | 0 | 0 | 0 | 0 | 0 | 0 | 0 | 0 |

After comparison, the following data is obtained from the line pattern buffer: 0x0300, 0x0100, 0x0100, 0x0100, 0x0100, 0x0100, 0x0100, 0x0100, 0x0100, 0x0100, 0x0100, 0x0100, 0x0100, 0x0100, 0x0100, 0x0300.

The two images have a total of 18 differences. Accordingly, the dispatch procedure uses the RLEDMP method to compress the current block from the current image.

Figure 5:
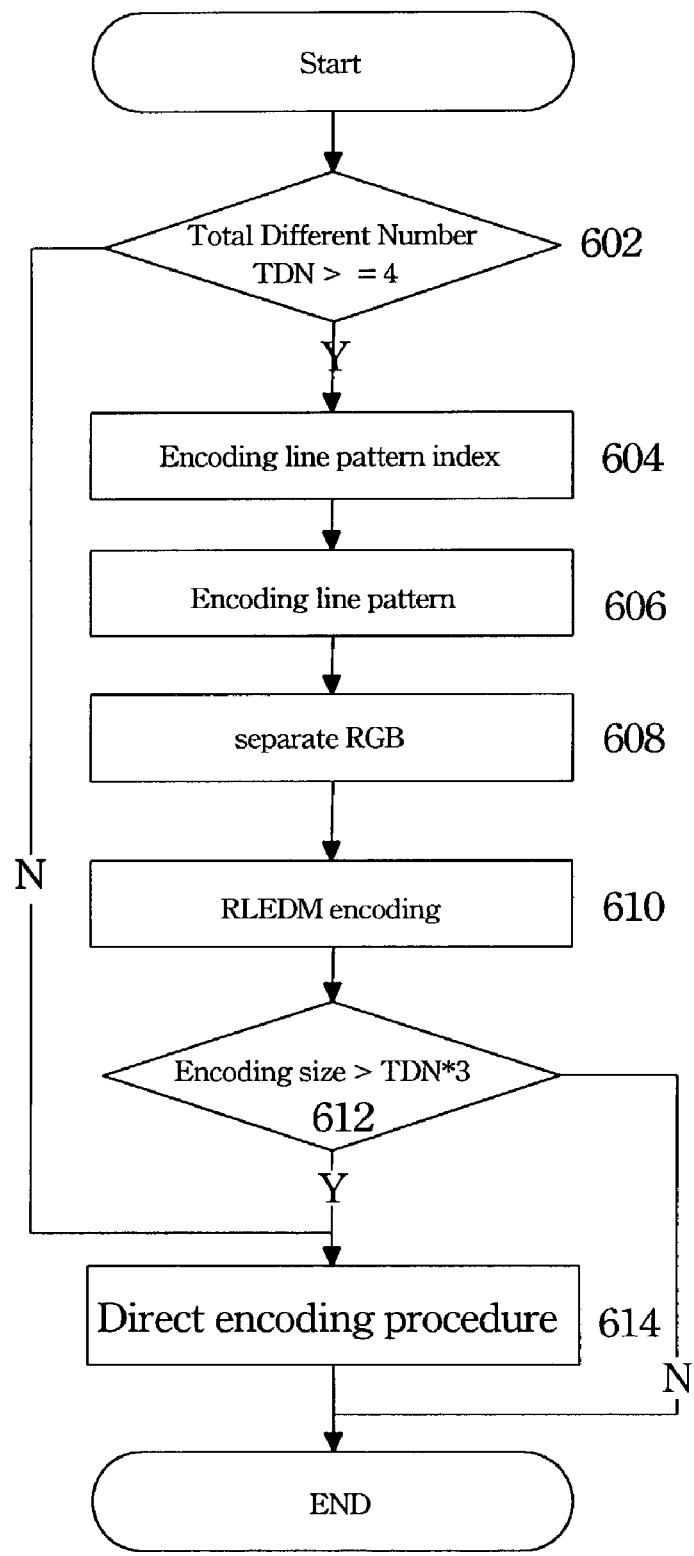
FIG. 5 is a flow chart illustrating a preferred embodiment of a method for providing RLEDMP encoding algorithm for image compression in accordance with the present invention.

FIG. 5 is a flow chart illustrating a preferred embodiment of a method for providing an RLEDMP encoding algorithm for image compression in accordance with the present invention. First, in step 602, the total difference number (TDN) is read. The total difference number (TDN) is obtained from a fuzzy comparison concerning the RLEDMP algorithm. If TDN is determined to be less than four, the process skips the RLEDMP encoding method. In other words, neither the RLE nor the DM algorithm is used. The process instead uses a direct encoding method in 614. If the TDN is determined to be greater than or equal to four, a line pattern index is written in step 604. Also, the line pattern buffer is encoded in step 606. Steps 604 through 606 are called a P method. Next, the difference pixels are split into R, G and B components in step 608. Then, the process uses the RLEDM encoding method to compress split pixels in step 610. Finally, the encoded data size is compared with TDN*3 in step 612. If the encoded data size is determined to be greater than TDN*3, the process calls direct encoding procedure in step 614.

Figure 6:
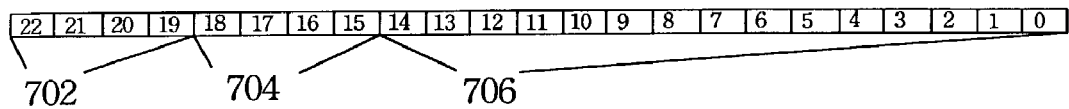
FIG. 6 illustrates an encoded pixel format using direct encoding according to the present invention.

FIG. 6 illustrates an encoded pixel format using direct encoding. Each encoded pixel using a direct encoding method consists of a position and an original pixel value. The high nibble of the first byte stores line 702 numbers, the low nibble represents column 704 information, and the remaining bits are used for pixel 706 values.

Figure 7:
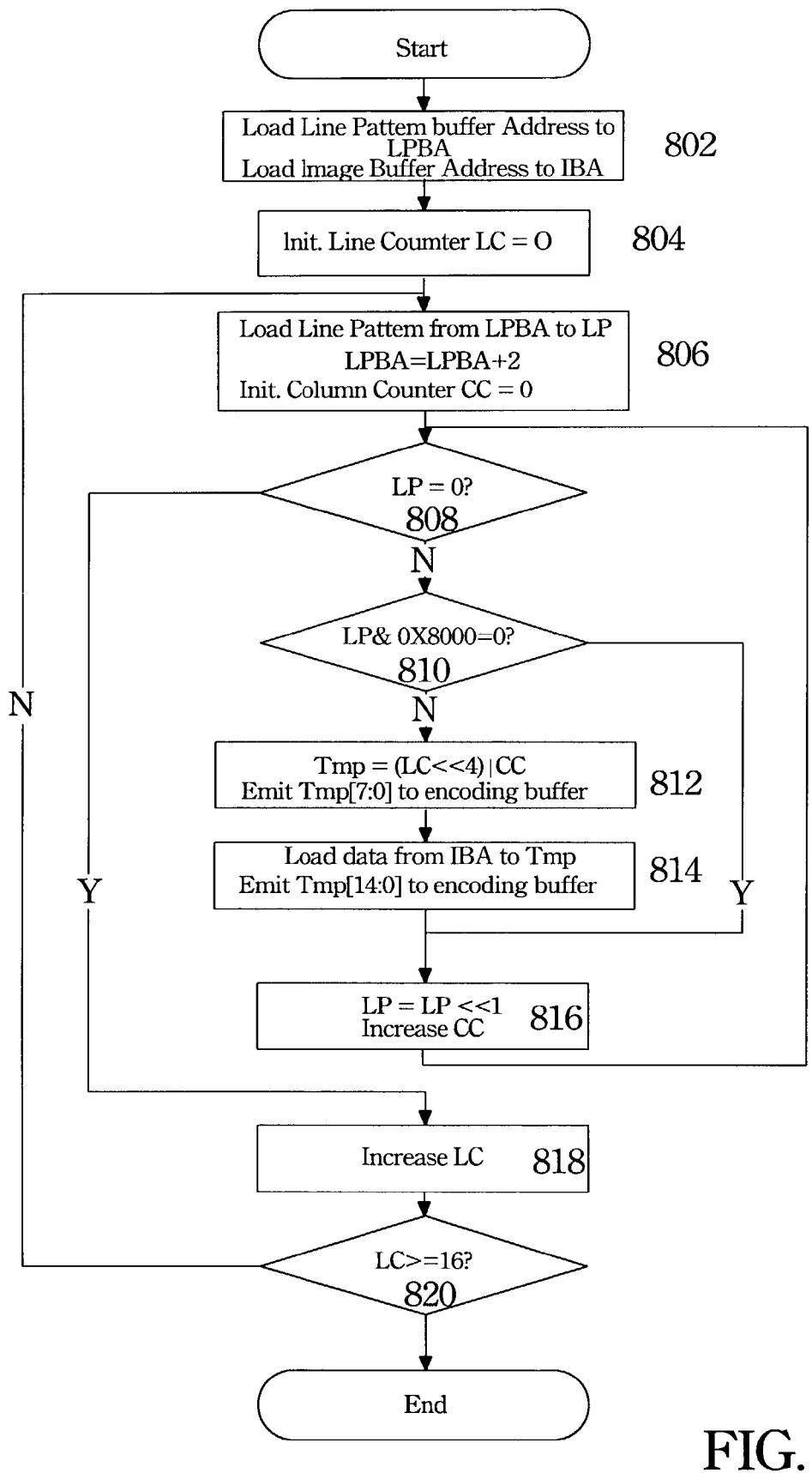
FIG. 7 is a flow chart illustrating in more detail direct encoding in accordance with the present invention.

FIG. 7 is a flow chart illustrating in more detail direct encoding (step 614, FIG. 5) in accordance with the present invention. First, the direct encoding process is initialized, in steps 802 and 804. In the initialization, the line pattern buffer address is loaded, and the local variable line counter is set equal to zero. Next, the direct encoding process loads line pattern information from a line pattern buffer in step 806. At the same time, the local variable column counter is set equal to zero, and the line pattern address is increased by two. If the line pattern is determined to be equal to zero in step 808, the process goes to step 818. If the most significant bit of the line pattern is determined to not be equal to zero in step 810, the current column counter and line counter are encoded to buffer in step 812. According to the information of line and column, the program obtains necessary pixels from the image buffer, and stores the same in the output stream in step 814. If the most significant bit of the line pattern is determined to be equal to zero in step 810, the process skips steps 812 and 814 and proceeds to step 816. In step 816, the line pattern is shifted left by one bit, and column counter is increased by one. The process then loops backs to step 808. If the line pattern is determined to be equal to zero, via step 808, the process proceeds to step 818. In step 818, the line counter is increased by one. If the line counter is less than sixteen in step 820, the process loops back to step 806.

The RLEDMP algorithm converts nonlinear data into liner data. The P method carries this burden. It compresses the line pattern buffer to the output stream. First, the P method creates a line pattern index. 16 bits are used for the line pattern index. Each bit represents one line pattern. If the line pattern is not zero, the bit is set to 1 to show that the line contains data. Second, the P method compresses the line pattern buffer.

Figure 8:
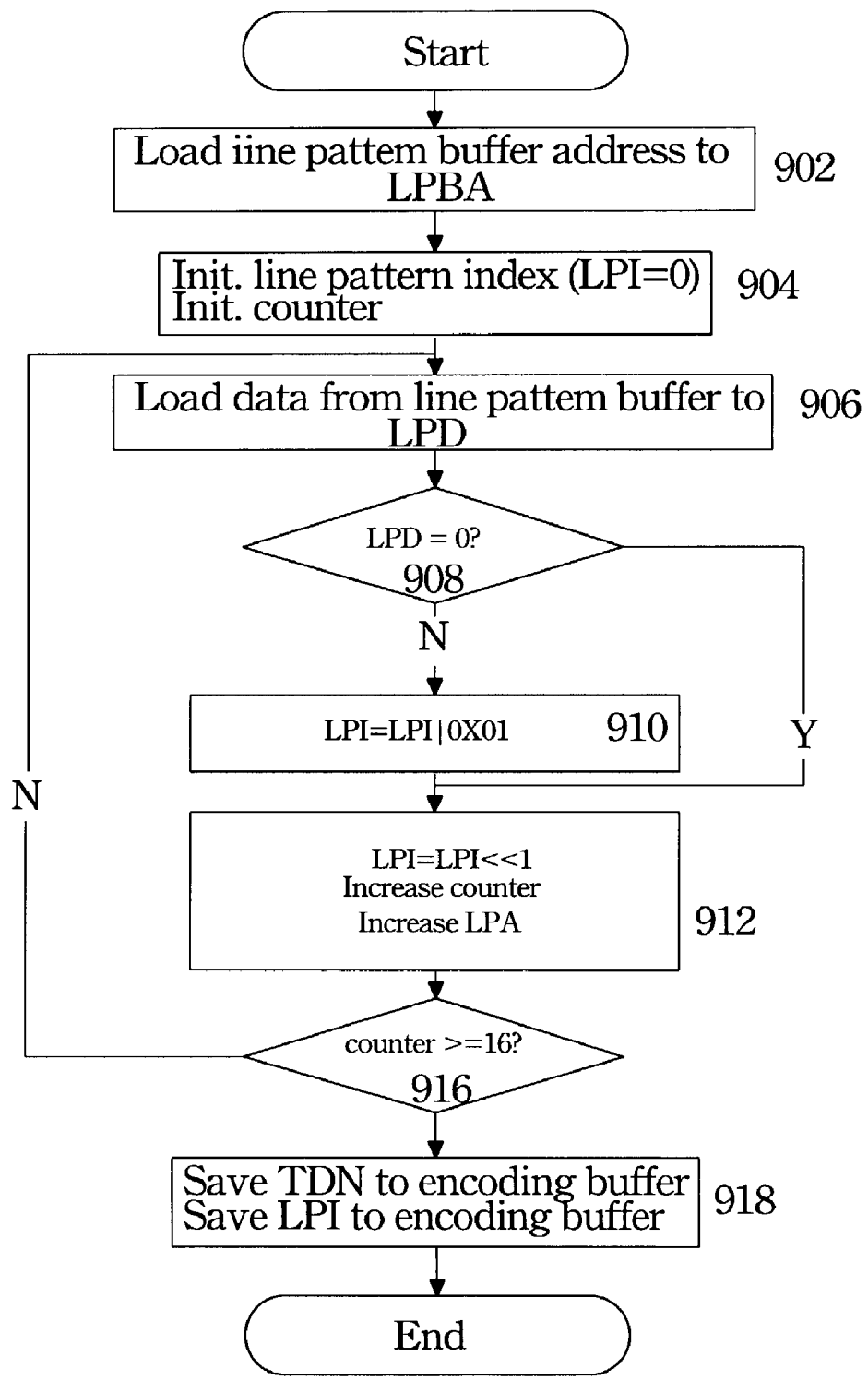
FIG. 8 is a flow chart illustrating in more detail the encoding the line pattern index in accordance with the present invention.

FIG. 8 is a flow chart illustrating in more detail the encoding of the line pattern index (step 604, FIG. 5) in accordance with the present invention. First, the process is initialized in step 902 and 904. In the initialization, the line pattern buffer address is read. The local variable line pattern index and counter are set to equal zero. Next, the line pattern (LP) from line pattern buffer is read in step 906. If the LP is determined to not be equal to zero in step 908, then the least significant bit of the line pattern index is set equal to 1 in step 910. Then, the line pattern index is shifted left by one bit and the counter and line pattern buffer address are increased in step 912. If the counter is determined to be less than sixteen in step 916, then the process loops back to step 906. Finally, the line pattern index is stored in the output stream in step 918.

Here, the description explains in more detail the encoding the line pattern buffer (step 606, FIG. 5) in accordance with the present invention. Since the line pattern index already contains line information, in this stage, the P method only processes those line patterns not equal to zero. The P method divides each line pattern into four nibbles. If the nibble is not equal to zero, it emits bit 1 and the value of the nibble to the output stream. If the value of nibble is determined to be equal to zero and the remaining nibbles are not equal to zero, it emits bit 0 and bit 1; if remaining nibbles are determined to be equal to zero, it emits two bits 0.

Nibble is not equal to zero

| 1 | X | X | X | X |
|---|---|---|---|---|

Nibble is equal to zero and remaining nibbles are not equal to zero

| 0 | 1 |
|---|---|

Nibble is equal to zero and remaining nibbles are equal to zero

| 0 | 0 |
|---|---|

If, for example, the P method has an encoded position message for the current block and it is time to process the scattered data, the RLEDMP algorithm gathers these data via line pattern information. The data collector tests every bit of line pattern buffer. If the data collector finds a nonzero bit, the data collector obtains pixel data from the image buffer according to the current position. The pixel data from image buffer using the RGB555 format is immediately split into R, G and B. All R data are stored in the RGB sample buffer (RGBSampleBuffer). All G data are stored in RGB-SampleBuffer with offset of TDN, and all B data are stored in RGBSampleBuffer with an offset of TDN*2.

For example, suppose the following image data are obtained:

| P1 | P2 | | P3 | ... |
|----|----|----|----|-----|
|    | P4 | P5 |    | ... |
|    |    | P6 |    | ... |
|    | P7 |    | P8 | ... |
| ... | ... | ... | ... | ... |

When P1 uses the RGB555 format, the image data consist of RP1GP1BP1. The value of RP1, GP1 and BP1 are less than 0x20.

The current block has 8 differing pixels. After splitting, RGBSampleBuffer obtains the following linear data:

$R_{P1}R_{P2}R_{P3}R_{P4}R_{P5}R_{P6}R_{P7}R_{P8}G_{P1}G_{P2}G_{P3}G_{P4}$
$G_{P5}G_{P6}G_{P7}G_{P8}$

If, for example, the following data (8 bytes) have to be compressed:

0x08, 0x09, 0x09, 0x08, 0x08, 0x08, 0x09, 0x08 using RLE (the encoding scheme of the preferred embodiment) compression, the compressed buffer takes up 5 bytes (40 bits) and looks like this, for example:

0x40, 0x49, 0x42, 0x48, 0x40

If a DM method is utilized to compress the same data, the following data is obtained:

0x42, 0x45, 0x00, 0xD8

As seen from the compression result, the DM method only uses 4 bytes (actually, 31 bits). This is the reason why the two methods are combined here.

Figure 9:
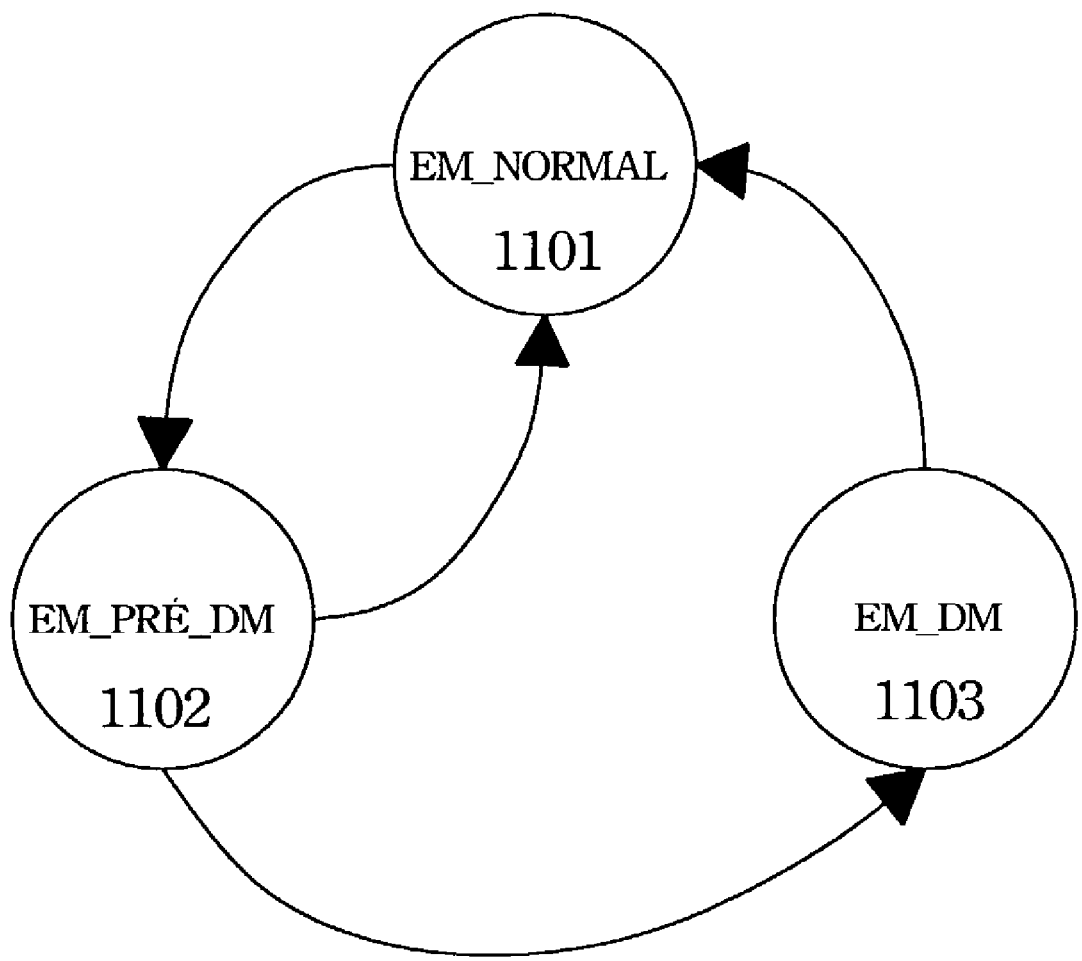
FIG. 9 illustrates status machines used in RLEDM according to the present invention.

FIG. 9 illustrates status machines, EM_NORMAL 1101, EM_PRE_DM 1102 and EM_DM 1103, used in RLEDM. Depending on a minimum encoding size rule, the status machine automatically changes between these three statuses. Two types of RLE are used in the RLE method. First, RLE (RLE01) searches for a repeated character string like, for example, "AAAAAA". Second, the RLE (RLE02) method finds an interlaced repeated characters string like, for example, "ABABAB". Three encoding modes are defined in the RLEDM method. For example, if the current encoding mode is in an EM_DM mode, even if the algorithm obtains an RLE01 format string, the algorithm predicts the coming data size, compares with current encoding mode size, and then makes final decision.

The following table illustrates codes used in RLE01. When the repeat counter is less than 5, RLE01 using following codes to compress data.

| Base Value | | | | | Flag | Unit Amount | |
|---|---|---|---|---|---|---|---|
| X | X | X | X | X | 1 | N | N |

For example:
Raw Data: 0x06
Compressed Codes: 6(5 bits), 1(1 bit), 0(2 bits)
Raw Data: 0x06, 0x06, 0x06, 0x06
Compressed Codes: 6(5 bits), 1(1 bit), 3(2 bits)

However, no repeat counter can occupy a space less than zero; therefore, 1 is always implicitly added to the repeat counter.

When the repeat counter number is greater than 4 and less than 129, RLE01 using following codes.

| Base Value | | | | | Flag | | Unit Amount | | | | | | |
|---|---|---|---|---|---|---|---|---|---|---|---|---|---|
| X | X | X | X | X | 0 | 0 | N | N | N | N | N | N | N |

For example:
Raw Data: 0x06, 0x06, 0x06, 0x06, 0x06, 0x06, 0x06
Compressed Codes: 6(5 bits), 00(2 bits), 6(7 bits)

Although this example illustrates a unit amount of seven bits, any number of bits larger than two may be used.

The following table illustrates codes used in RLE02.

| Base Value | | | | | Flag | | Base Value | | | | | Unit Amount | | | | | | |
|---|---|---|---|---|---|---|---|---|---|---|---|---|---|---|---|---|---|---|
| A | A | A | A | A | 0 | 1 | 1 | 0 | 0 | B | B | B | B | B | N | N | N | N | N | N |

For example:
Raw Data: 0x11, 0x06, 0x11, 0x06, 0x11, 0x06
Compressed Codes: 11(5 bits), 01(2 bits), 100(3 bits), 6(5 bits), 2(7 bits)

Although this example illustrates a unit amount of seven bits, any number of bits may be used.

When the value difference of data units varies between 3 and −3, the DM method uses the following codes:

| Value Difference | Compressed Code |
|---|---|
| 0 | 000 |
| 1 | 001 |
| 2 | 010 |
| 3 | 011 |
| −1 | 101 |
| −2 | 110 |
| −3 | 111 |
| EOF | 100 |

| Base Value | | | | | Flag | | | Compressed Code | End Flag | | |
|---|---|---|---|---|---|---|---|---|---|---|---|
| A | A | A | A | A | 0 | 1 | 0 | ... | 1 | 0 | 0 |

For example:
Raw Data: 6, 7, 5, 8, 5
Compressed Codes: 6(5 bits), 010(3 bits), 001(3 bits), 110(3 bits), 011(3 bits) 111(3 bits), 100(3 bits)

Figure 10A:
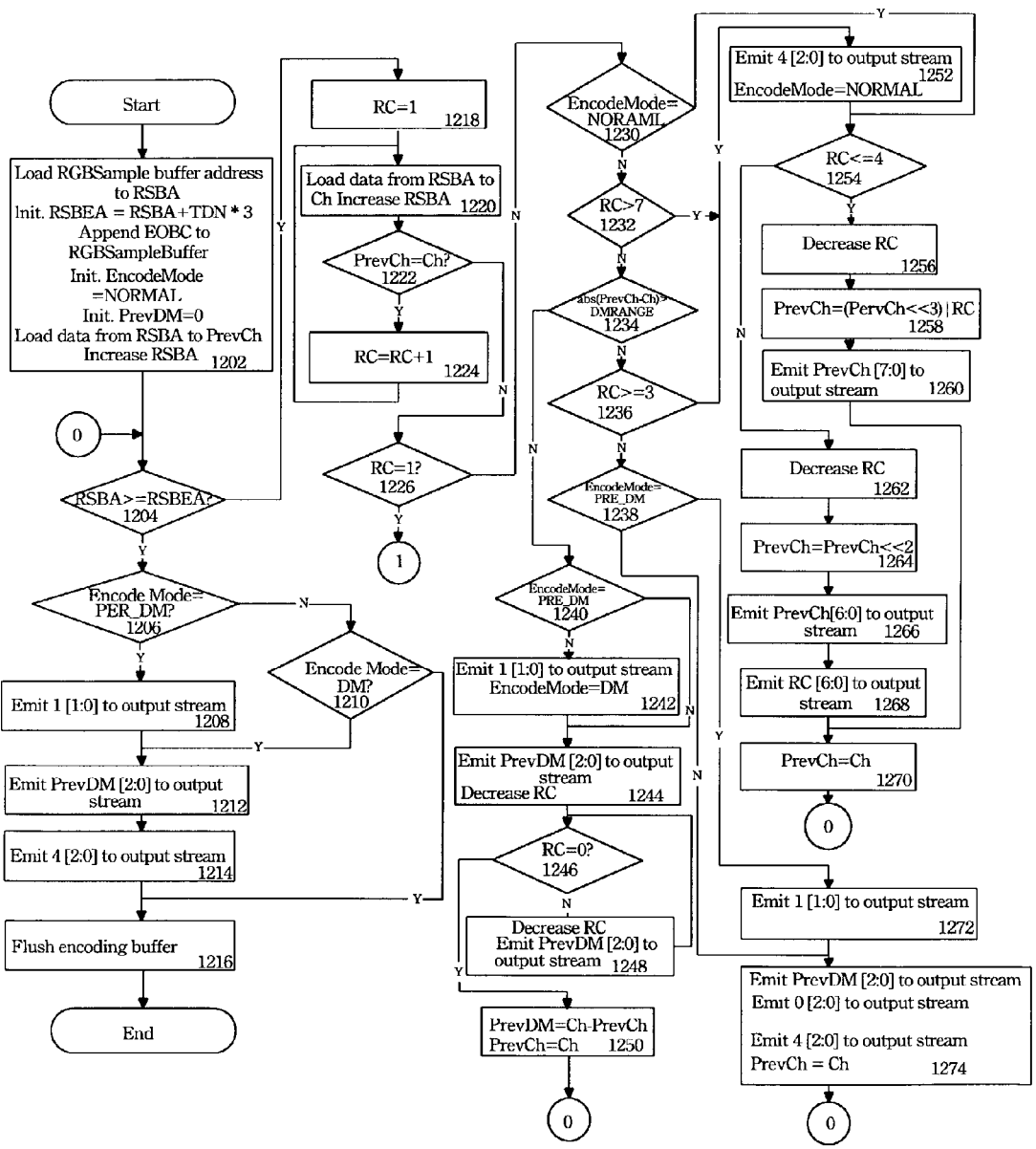
FIG. 10A, FIG. 10B and FIG. 10C are flow charts illustrating in more detail the RLEDM encoding algorithm in accordance with the present invention.
Figure 10B:
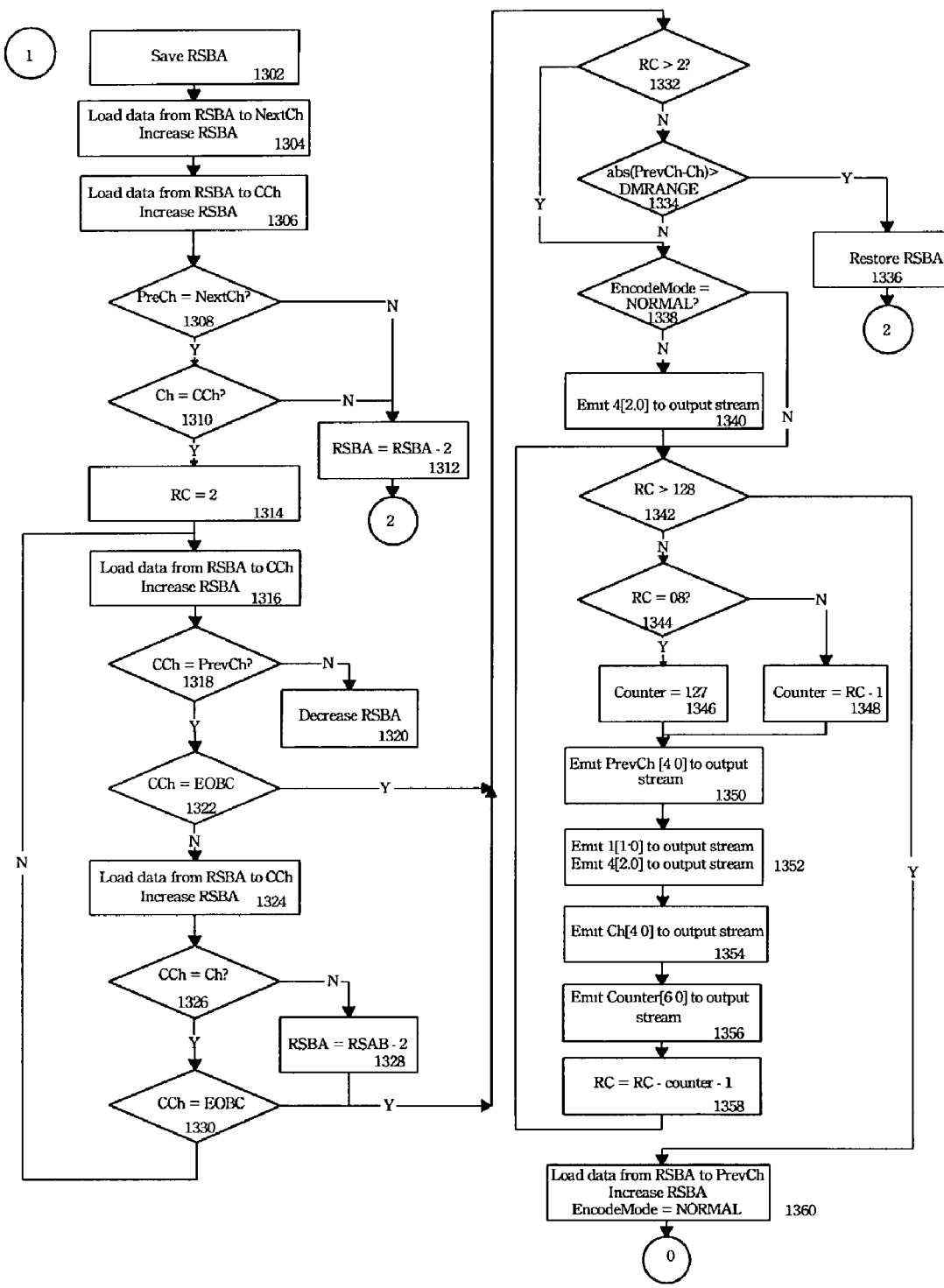
Figure 10C:
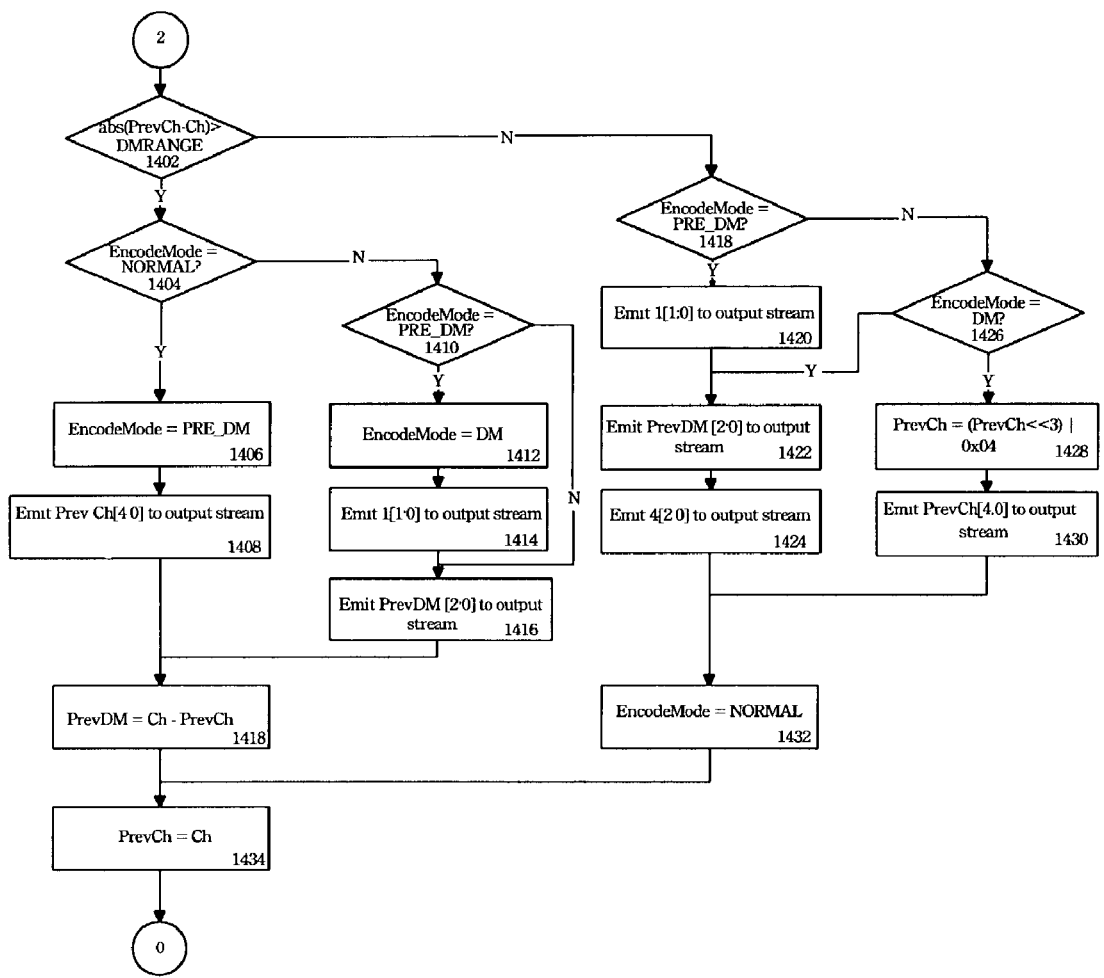

FIG. 10A, FIG. 10B and FIG. 10C are flow charts illustrating in more detail the RLEDM encoding algorithm (step 610, FIG. 5) in accordance with the present invention. FIG. 10A focuses on process initialization, RLE01 encoding and ending process. First, the process is initialized in step 1202. In the initialization, the RGBSampleBuffer address (RSBA) is loaded, the end address of RGBSampleBuffer (RGBEA) is calculated by TDN*3, and an end of buffer character (EOBC)−0x20 is appended to the end of RGBSampleBuffer. The local variable encoding mode (EncodeMode) is set equal to EM_NORMAL and the previous delta-modulation difference value (PrevDM) is set equal to 0. Finally, the previous character (PrevCh) is initialized by reading a byte from RGBSampleBuffer, and RSBA is increased by one.

Once the encoding process is initialized in step 1202, step 1204 determines if RSBA equals RSBEA. If so, then if EncodeMode equals EM_PRE_DM in step 1206, the encoder emits 01 (step 1208), three bits of PrevDM (step 1212) and 100 (step 1214) to the output stream. After that, the process flushes the encoding buffer in step 1216. If the current encoding mode is not equal to EM_PRE_DM (step 1206), step 1210 determines if the EncodeMode is equal to EM_DM. If so, then the process goes to step 1212 directly. If not, the process goes to step 1216.

If process determined RSBA is not equal to RSBEA in step 1204, the repeat counter (RC) is set to equal to one in step (1218). The process determines a value for a repeat counter for a previous character (PrevCh). The current character (Ch) is read from RGBSampleBuffer, and RSBA is increased by one in step 1220. The process determines if Ch is equal to PrevCh in step 1222. If Ch is equal to PrevCh, the value of RC is increased by one in step 1224 in order to count the number of sequential equal bytes. The process then loops back to step 1220. If Ch is not equal to PrevCh, the process goes to step 1226. IF step 1226 determines RC is equal to one, then the process goes to FIG. 10B. If RC is determined to not be equal to one, the process decides which encoding status will be used.

The process determines which encoding status will used to encode the repeat data. First, step 1230 determines if EncodeMode equals EM_NORMAL. If EncodeMode equals EM_Normal and RC is less than five in step 1254, RC is decreased by one in step 1256, and the value of PrevCh is shifted left by three bits and added to RC in step 1258. After the preprocess, the process emits eight bits of PrevCh to the output stream in step 1260. PrecCh is then set equal to Ch to track the byte value of the next byte sequence, via step 1270. Then process then loops back to step 1204. If step 1254 determines that the value of RC is larger than four, the value of RC is decreased by one in step 1262 and PrevCh is shifted left by two bits in step 1264. The process emits seven bits of PrevCh to output a stream in step 1266, and then seven bits of RC are emitted to the output streamin step 1268. After that, PrevCh is set equal to Ch (step 1270). The process then loops back to step 1204.

If step 1230 determines that the current encoding mode is not equal to EM_NORMAL, then step 1232 checks whether RC is greater than seven. If RC is greater than seven, the process emits 100 to the output stream, resets the encoding mode to EM_NORMAL in step 1252, and goes to step 1254. If RC is not greater than seven, and if the absolute value of PrevCh minus Ch is greater than the value of delta-modulation difference range (DMRANGE) in step 1234, then the process determines if RC is greater than 3 in step 1236. If RC is greater than 3, the process goes to step 1252. If RC is not greater than 3, and if current encoding mode equals EM_PRE_DM in step 1238, then 10 is emitted to the output stream, via step 1272 and the process emits three bits of PrevDM, 000 and 100 to the output stream in step 1274. If current encoding mode is not equal to EM_PRE_DM, the process goes directly to step 1274. If the absolute value from step 1234 is not greater than DMRANGE, the process determines if the current encoding mode is equal to EM_PRE_DM step 1240. If the current encoding mode is equal to EM_PRE_DM, then 10 is emitted to the output stream, and EncodeMode is set equal to EM_DM in step 1242. If the current encoding mode is not equal to EM_PRE_DM, the process skips step 1242. Then the process emits three bits of PrevDM to the output stream and RC is decreased by one in step 1244. The process determines if RC equals zero; if not, the process repeatedly emits 000 to the encoding buffer and decreases RC by one until RC is equal to zero in step 1248. If RS equals zero, PrevDM is set equal to Ch minus PrevCh, and PrevCh is set equal to Ch. The process then loops back to step 1204.

FIG. 10B focuses on RLE02 encoding. First, the process saves the current position of the input stream, via step 1302, and reads two bytes from RSBA. The first byte is loaded into NextCh and RSBA increased by one in step 1304, and the second byte is loaded into CCh and RSBA increased by one in step 1306. Next, the process determines if PrevCh equals NextCh and Ch equals CCh. If PrevCh does not equal NextCh and Ch does not equal CCh, the process decreases RSBA by two (step 1312) and proceeds to FIG. 10C. If PrevCh equals NextCh and Ch equals CCh, the value of RC is set to two, in step 1314. Then the process compares the next two bytes from RSBA with PrevCh and Ch in steps 1318, 1322, 1324 and 1326, in order to count the number of sequential equal bytes. If any difference is determined, the process goes to step 1332. In step 1332, the process determines if RC is greater than 2. If RC is greater than 2, and if current encoding mode equals EM_NORMAL (step 1338), the process flushes the related value to the output stream according to RLE02 code rules. If step 1332 determines that RC is not greater than two, the process checks if the absolute value of PrevCh minus Ch is greater than DMRANGE in step 1334. If the absolute value of PrevCh minus Ch is greater than DMRANGE, then the process restores the position of the input stream in step 1336 and proceeds to FIG. 10C. If the absolute value of PrevCh minus Ch is not greater than DMRANGE, the process goes to step 1338. If step 1338 determines that the current encoding mode is equal to EM_NORMAL, the process emits 100 to output stream, via step 1340.

According to RLE02 code rules, whether RC equals zero is first determined in step 1342. If RC equals 0, the process loads data from the input stream, saves the data to PrevCh, and increases RSBA by one in step 1360. The current encoding mode is set to EM_NORMAL. If RC does not equal 0, and if RC is greater than 128 in step 1344, a local variable counter is set equal to 127 (step 1346). Otherwise, the counter is set to RC minus one (step 1348). Next, the five bits of PrevCh (step 1350), 10, 100 (step 1352), five bits of Ch (step 1354) and seven bits of counter (step 1356) are emitted to the output stream. The value of RC is set to RC-counter-1 in step 1358. The above steps loop until RC equals zero.

FIG. 10C focus on DM encoding. First, the process determines if the absolute value of PrevCh minus Ch is greater than DMRANGE, via step 1402. If not, if EncodeMode equals EM_NORMAL (step 1404), the EncodeMode is set to EM_PRE_DM in step 1406, and five bits of PrevCh are emitted to the output stream in step 1408. Next, the value of PrevDM is set to Ch minus PrevCh in step 1418 and PrevCh is set to Ch (step 1434). Then the process loops back to step 1204, FIG. 10A.

If in step 1404, EncodeMode is not equal to EM_NORMAL, the process checks if EncodeMode is equal to EM_PRE_DM (step 1410). If so, then EncodeMode is set to EM_DM (step 1412), 10 (step 1414) and three bits of PrevDM (step 1416) are emitted to the output stream. If EncodeMode is not equal to EM_PRE_DM, the process proceeds to step 1416 and then goes on to step 1418.

If, in step 1402, the absolute value of PrevCh minus Ch is greater than DMRANGE, then the process determines if EncodeMode is equal to EM_PRE_DM via step 1418. If so, 10 (step 1420), three bits of PrevDM (step 1422) and 100 (step 1424) are flushed to output stream. Then the EncodeMode is set to EM_NORMAL (step 1432), the process proceeds to step 1434. If the absolute value of PrevCh minus Ch is not greater than DMRANGE, and if EncodeMode is equal to EM_DM (step 1426), the process goes to step 1422. If EncodeMode is not equal to EM_DM, the value of PrevCh is shifted three bits and added to 100 (step 1428) and eight bits of PrevCh are flushed to the output stream in step 1430. Finally, the process proceeds to step 1432.

Figure 1:
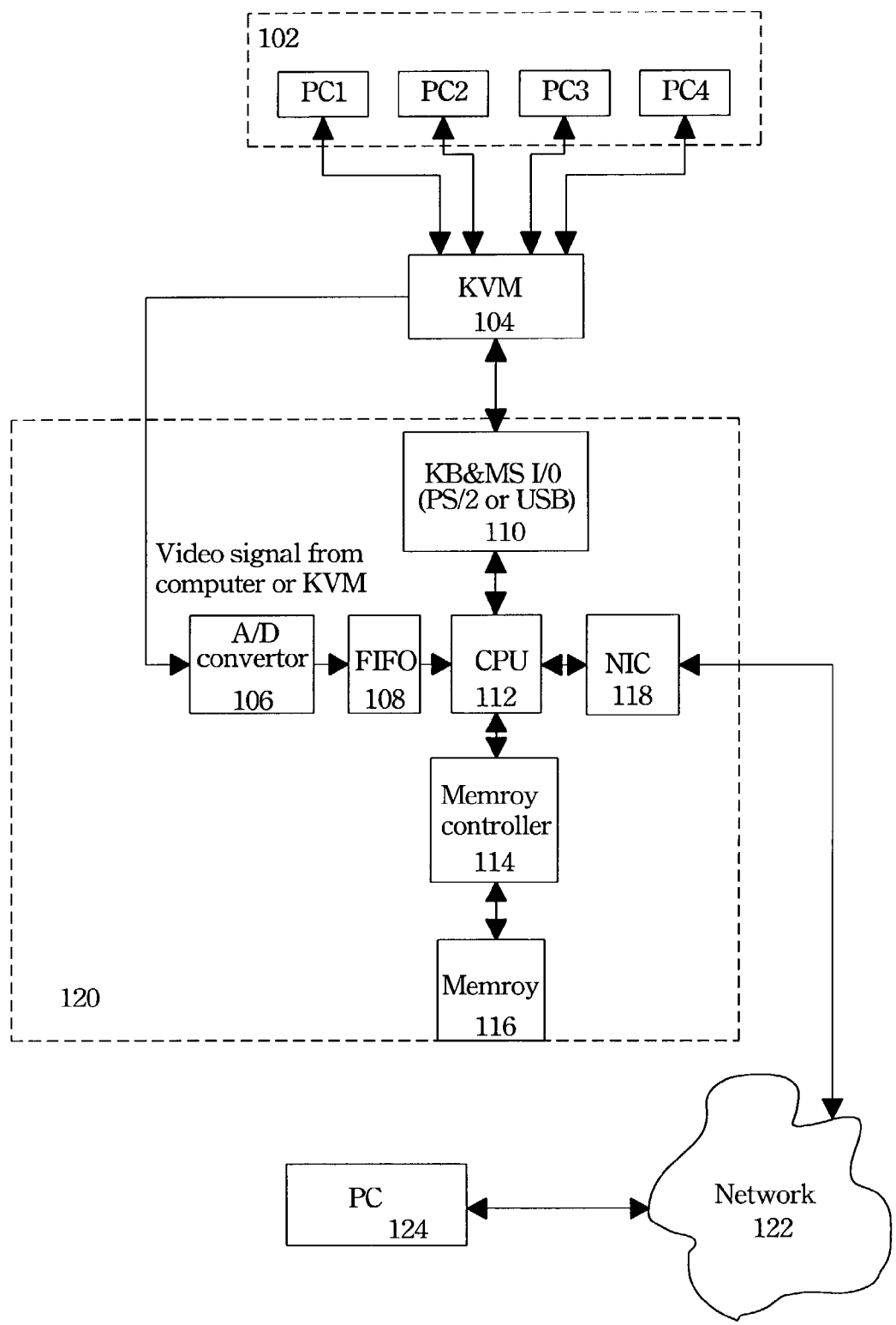
FIG. 1 illustrates a conventional remote control system which uses image compression algorithms.

In the context of the remote control system illustrated in FIG. 1, several advantages are obtained by the method in accordance with the present invention. For example, a computer image has a resolution of 800 pixels by 600 pixels, with one pixel using 16 bits. If the JPEG algorithm's compression ratio is 15:1, after compression, the compressed data are about 64000 bytes. If 2000 pixels are decentralized in 200 and separated 16 by 16 blocks, and if a JPEG algorithm is utilized, only approximately 6736 bytes are needed. If RLEDMP is utilized, even in a direct encoding method, the amount of compressed data is 3000 bytes. If, for example, the RLEDMP algorithm's compression ratio is 2:1, only 1500 bytes are needed. The present invention can reduce the image data transfer rate as well as reduce the network bandwidth requirement so that efficient transfer of consecutive compressed images through a network becomes practical.

A method for providing improved run-length encoding and delta-modulation encoding algorithm for image compression is disclosed herein. The present invention provides a way to combine run-length encoding and a delta-modulation encoding method. This invention provides a method and system for compressing computer image using a compression method suitable for different situations, and, by taking advantage of different compression methods, reduces the image data transfer rate and reduces the network bandwidth requirement so that efficient transfer of consecutive compressed images through a network becomes practical.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A method of image compression for dealing with consecutive images and reducing compressed sizes of the consecutive images, the method comprising:
   (a) loading data from a previous block and a current block of the consecutive images, wherein the previous block has a plurality previous pixels and the current block has a plurality current pixels, and the loading step (a) further comprises:
      (a1) reading each pixel of the current pixels; and
      (a2) reading each corresponding pixel of the previous pixels;
   (b) utilizing a fuzzy comparison to analyze the previous pixels and the current pixels, wherein the fuzzy comparison comprises:
      (b1) loading a fuzzy comparison range;
      (b2) separating each pixel of the current pixels to form a current red data, a current blue data, and a current green data;
      (b3) separating each corresponding pixel of the previous pixels to form a previous red data, a previous blue data, and a previous green data;
      (b4) determining no-difference if absolute values of the previous red data minus the current red data, the previous blue data minus the current blue data, and the previous green data minus the current green data, are all within the fuzzy comparison range;
      (b5) determining one-difference if any one of the absolute values of the previous red data minus the current red data, the previous blue data minus the current blue data, and the previous green data minus the current green data, is greater than the fuzzy comparison range; and
      (b6) repeating steps (b1) to (b5) until each pixel of the current pixels is compared with each corresponding pixel of the previous pixels;
   (c) determining an encoding method according to a result of the fuzzy comparison; and
   (d) encoding the data of the current block by way of the encoding method.

2. The method of claim 1, wherein the fuzzy comparison further comprises:
   (b1.1) subtracting each pixel of the current pixels from each corresponding pixel of the previous pixels to obtain a comparison result;
   (b1.2) determining no-difference if the comparison result is equal to zero; and
   (b1.3) conducting steps (b2) to (b6) if the comparison result is not equal to zero.

3. The method of claim 1, wherein step (b) further comprises:
   (b7) creating a line pattern index matrix with 1 representing one-difference and 0 representing no-difference; and
   (b8) creating a difference matrix to store difference pixels of the current pixels, wherein the difference pixels correspond to the 1 of the line pattern index matrix.

4. The method of claim 3, wherein step (c) further comprises:
   (c1) calculating a total difference number according to a quantity of the 1's in the line pattern index matrix;
   (c2) comparing the total difference number with a predetermined threshold;
   (c3) utilizing a JPEG encoding algorithm to encode the current block if the total difference number is greater than the predetermined threshold; and
   (c4) utilizing a run-length and delta-modulation encoding algorithm to encode the current block if the total difference number is not greater than the predetermined threshold.

5. The method of claim 4, wherein the step (c4) further comprises:
   separating the difference pixels to form red data, blue data and green data; and
   rearranging the red data, the blue data and the green data to form linear data which arranges the red data together, the blue data together and then the green data together, wherein the linear data have a plurality bits to record the red data, the blue data and the green data.

6. The method of claim 5, wherein the run-length and delta-modulation encoding algorithm comprise:
   a direct encoding algorithm if the total difference number is less than a direct encoding threshold;
   a delta-modulation encoding algorithm if the total difference number is not less than the direct encoding threshold and value deviations of the plurality bits are not greater than a delta-modulation range; and
   a run-length encoding algorithm if the total difference number is not less than the direct encoding threshold and value deviations of the plurality bits is greater than a delta-modulation range;
   wherein the run-length and delta-modulation encoding algorithm determine utilization of the direct encoding algorithm if an encoded size of the delta-modulation encoding algorithm and the run-length encoding algorithm is larger than the encoded size of the direct encoding algorithm.

7. The method of claim 6, wherein the direct encoding threshold is 4.

8. The method of claim 6, wherein the delta-modulation range is −3 to +3.

9. The method of claim 6, wherein the run-length encoding algorithm further comprises a first run-length encoding algorithm to deal with a same character in the plurality of bits.

10. The method of claim 6, wherein the run-length encoding algorithm further comprises a second run-length encoding algorithm to deal with interlaced same characters in the plurality of bits.

11. The method of claim 4, wherein the predetermined threshold is less than 128 when the current block includes 256 pixels.

12. The method of claim 7, wherein the predetermined threshold is 32.

13. The method of claim 1, wherein the fuzzy comparison range is 2.

14. The method of claim 1, wherein the method of image compression is utilized in a keyboard-video-mouse switch to remote control computers via a network and reduces the bandwidth requirements of the network.

15. A method of image compression for dealing with consecutive images in a keyboard-video-mouser switch to reduce compressed sizes of the consecutive images and bandwidth requirements of a network, the method comprising:
   loading data from a previous block and a current block of the consecutive images, wherein the previous block has a plurality previous pixels and the current block has a plurality current pixels, wherein the loading step further comprises:
      reading each pixel of the current pixels; and
      reading each corresponding pixel of the previous pixels;
   utilizing a fuzzy comparison to analyze the previous pixels and the current pixels, wherein the fuzzy comparison comprises:
      loading a fuzzy comparison range;
      subtracting each pixel of the current pixels and each corresponding pixel of the previous pixels to obtain a comparison result;
      determining no-difference if the comparison result is equal to zero;
      if the comparison result is not equal to zero,
         separating each pixel of the current pixels to form a current red data, a current blue data, and a currant green data,
         separating each corresponding pixel of the previous pixels to form a previous red data, a previous blue data, and a previous green data,
         determining no-difference if absolute values of the previous red data minus the current red data, the previous blue data minus the current blue data, and the previous green data minus the current green data, are all within the fuzzy comparison range, and
         determining one-difference if any one of the absolute values of the previous red data minus the current red data, the previous blue data minus the current blue data, and the previous green data minus the current green data, is greater than the fuzzy comparison range; and
      repeating the fuzzy comparison until each pixel of the current pixels is compared with each corresponding pixel of the previous pixels;
   determining an encoding method according to a result of the fuzzy comparison; and
   encoding the data of the current block by way of the encoding method.

16. The method of claim 15, wherein the fuzzy comparison range is 2.

17. The method of claim 15, wherein the fuzzy comparison further comprises:
   creating a line pattern index matrix with 1 representing one-difference and 0 representing to no-difference; and
   creating a difference matrix to store differing pixels of the current pixels, wherein the differing pixels correspond to the 1 of the line pattern index matrix.

18. The method of claim 17, wherein the step of determining an encoding method further comprises:
   calculating a total difference number according to a quantity of the 1 in the line pattern index matrix;
   comparing the total difference number with a predetermined threshold;
   utilizing a JPEG encoding algorithm to encode the current block if the total difference number is greater than the predetermined threshold; and
   utilizing a run-length and delta-modulation encoding algorithm to encode the current block if the total difference number is not greater than the predetermined threshold.

19. The method of claim 18, wherein the step of utilizing a run-length and delta-modulation encoding algorithm to encode the current block further comprise:
   separating the difference pixels to form red data, blue data and green data; and
   rearranging the red data, the blue data and the green data to form linear data, wherein the red data are together, the blue data are together and then the green data are together, and wherein the linear data have a plurality bits to record the red data, the blue data and the green data.

20. The method of claim 19, wherein the run-length and delta-modulation encoding algorithm comprise:
   a direct encoding algorithm if the total difference number is less than 4;
   a delta-modulation encoding algorithm if the total difference number is not less than 4 and value deviations of the plurality bits are not greater than a delta-modulation range; and
   a run-length encoding algorithm if the total difference number is not less than 4 and value deviations of the plurality bits are greater than a delta-modulation range;
   wherein the run-length and delta-modulation encoding algorithm determine utilization of the direct encoding algorithm if an encoded size of the delta-modulation encoding algorithm and the run-length encoding algorithm are larger than the encoded size of the direct encoding algorithm.

21. The method of claim 20, wherein the delta-modulation range is −3 to +3.

22. The method of claim 20, wherein the run-length encoding algorithm further comprises a first run-length encoding algorithm to deal with a same character in the plurality of bits.

23. The method of claim 20, wherein the run-length encoding algorithm further comprises a second run-length encoding algorithm to deal with interlaced same characters in the plurality of bits.

* * * * *